United States Patent
Unno

(10) Patent No.: US 7,061,204 B2
(45) Date of Patent: Jun. 13, 2006

(54) MOTOR STARTER DEVICE HAVING REDUCED POWER CONSUMPTION

(75) Inventor: Mitsuru Unno, Shizuoka (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/017,606

(22) Filed: Dec. 20, 2004

(65) Prior Publication Data

US 2005/0184699 A1    Aug. 25, 2005

(30) Foreign Application Priority Data

Feb. 24, 2004    (JP)    ............... 2004-048420

(51) Int. Cl.
*H02P 1/42*    (2006.01)
*H02P 1/44*    (2006.01)
*H02P 5/36*    (2006.01)
*H02P 7/58*    (2006.01)

(52) U.S. Cl. ............... 318/786; 318/787; 318/788; 318/791; 318/792

(58) Field of Classification Search ............... 318/786, 318/787, 788, 791, 792
See application file for complete search history.

(56) References Cited

U.S. PATENT DOCUMENTS

| | | |
|---|---|---|
| 3,544,869 A | 12/1970 | Plouffe et al. |
| 3,562,614 A | 2/1971 | Gramkow |
| 3,586,939 A | 6/1971 | Buiting et al. |
| 3,600,656 A * | 8/1971 | Gramkow ............... 318/788 |
| 3,696,281 A * | 10/1972 | Gramkow et al. ......... 318/788 |
| 3,777,232 A | 12/1973 | Woods et al. |
| 4,388,580 A * | 6/1983 | Ramirez ............... 318/787 |
| 4,574,229 A | 3/1986 | Kim |
| 5,053,908 A | 10/1991 | Cooper et al. |
| 5,206,573 A * | 4/1993 | McCleer et al. ............ 318/787 |
| 5,302,885 A | 4/1994 | Schwarz et al. |

(Continued)

FOREIGN PATENT DOCUMENTS

JP    5-328767    12/1993

*Primary Examiner*—David Martin
*Assistant Examiner*—Erick Glass
(74) *Attorney, Agent, or Firm*—Russell E. Baumann; Frederick J. Telecky, Jr.

(57) ABSTRACT

A motor starter for use with a motor (20) having a main winding (M) and a start winding (S). The starter has a PTC thermistor (30) connected in series with the start winding (S). A triac (40) is connected between PTC thermistor (30) and a power source line. A control circuit (50) is connected to the power source line for providing a voltage for a gate terminal (G) of triac (40) and an overload relay (60) is connected between the power source (10) and the motor (20). The control circuit (50) preferably includes a current detecting circuit (52) for detecting the inrush current and a voltage generating circuit (54) for generating the voltage in response to the detected inrush current. At the startup of motor (20) the control circuit (50) allows triac (40) to turn on by providing the gate terminal (G) with the voltage based on the inrush current. According to this invention, the power consumption of the start winding S after the startup of the motor (20) can be almost zero thus providing low power consumption. In another embodiment not employing a PTC thermistor, a current detecting circuit and a voltage generating circuit are used to control the on and off states of a first triac (90) which in turn controls the on and off states of a second triac (92) connected in series with the start winding.

8 Claims, 7 Drawing Sheets

U.S. PATENT DOCUMENTS

| | | |
|---|---|---|
| 5,391,971 A | 2/1995 | Yamada et al. |
| 5,451,853 A | 9/1995 | Itoh |
| 5,617,001 A | 4/1997 | Nacewicz et al. |
| 5,898,289 A | 4/1999 | Hamatani |
| 5,952,811 A | 9/1999 | Hamatani |
| 6,122,154 A | 9/2000 | Damerow et al. |
| 6,276,969 B1 * | 8/2001 | Unno et al. ............... 439/621 |
| 6,329,784 B1 | 12/2001 | Puppin et al. |
| 6,356,047 B1 | 3/2002 | Cecconi |
| 6,433,975 B1 * | 8/2002 | Satoh et al. ............... 361/23 |
| 6,570,359 B1 * | 5/2003 | Dubhashi ............... 318/786 |
| 2004/0263109 A1 | 12/2004 | Schwartz |

\* cited by examiner

MOTOR STARTER DEVICE HAVING REDUCED POWER CONSUMPTION

FIELD OF THE INVENTION

This invention relates generally to motor starter devices for starting motors such as a single phase induction motor and more particularly to motor starter devices with reduced power consumption employing a triac for the startup control of the motor.

RELATED APPLICATIONS

Priority is claimed under 35 U.S.C. Section 119 of Japanese Patent Application No. 2004-048420 filed Feb. 24, 2004.

BACKGROUND OF THE INVENTION

A conventional motor starter device for a refrigerator or air conditioner compressor is shown in FIG. 8 along with motor 100 having a start winding S, a main winding M and a common terminal C. A positive temperature coefficient of resistivity thermistor (PTC) 110 is connected in series to start winding S and an overload protection device 120 is connected to terminal C. An operating capacitor CR is connected between start winding S and main winding M for increasing the efficiency of the motor.

During startup of the motor, sufficient current flows through start winding S since the resistance of the PTC thermistor is small at normal temperatures. After startup, PTC thermistor 110 generates heat on its own because of the current that flows through it which results in a sudden elevation of the thermistor resistance, thereby assuming a state of high resistance with an electric current of several tens of milli-amperes. Upon an overload or a restrained operation of motor 100, the overload protection device 120 opens the circuit as a result of the excessive current and/or winding temperature.

In the case of such a motor starter device, PTC thermistor 110 is maintained at high temperature and high resistance even during the normal operation of the motor, thereby limiting current to start winding S. As a result of this, several watts of power are wasted due to this holding current through PTC thermistor 110. Various attempts have been made to solve this problem. U.S. Pat. No. 5,898,289 shows, as seen in FIG. 9, a startup PTC thermistor 230 and a triac 240 connected in series with start winding 220 of motor 200 having a main winding 210 and a start winding 220. PTC thermistor 250 placed in parallel with startup PTC thermistor 230, is connected to gate terminal G of triac 240 for control of the triac. PTC thermistor 250 turns the triac 230 off after the motor starts for the regular operation of the motor thereby reducing power consumption of startup PTC thermistor 230.

U.S. Pat. No. 5,451,853 discloses a starter device for reducing power consumption by connecting an RC time constant circuit at the gate of a triac that has been connected in series to the startup PTC thermistor allowing the triac to conduct until the capacitor has been fully charged.

Japanese Toku Kai Hei 5-328767 further describes a trigger circuit connected to the gate of a triac that has been directly connected to the startup PTC thermistor, with the gate voltage lowered by the trigger circuit after the passage of a prescribed period of time following the startup of the motor, with the triac being turned off. The trigger circuit makes it possible, for example, to set the time by means of the RC time constant circuit or set the elapsed time using the time of the motor startup.

However, the conventional motor starter devices described above have the following limitations. With respect to the starter device shown in '289 patent, a trigger signal is impressed on triac 240 through PTC thermistor 250 for triac control when the motor is started up, triac 40 being turned on, with a result that the current flows to startup PTC thermistor 230. After a prescribed period of time following the startup, the resistance of PTC thermistor 230 increases due to the heat it generates and, in the case of the PTC thermistor 250 for triac control, its resistance value rises and the current that is impressed on the gate terminal of the triac 240 is lowered, with a consequence that the triac 240 turns off.

However, because triac control PTC thermistor 250 is connected in parallel with the startup PTC thermistor 230, the current flows through triac control PTC thermistor 250 even after triac 240 has been turned off, making it impossible to control the power consumption for this portion of the circuit.

In addition, there are cases where the triac control PTC thermistor 250 can be affected by outside temperature, making it impossible to carry out stable operation. If the ambient temperature happens to be high, the temperature of the triac control PTC thermistor also rises, with a result that triac 240 is turned off earlier than anticipated. When a re-startup is effected after an overload operation or a restrained operation, for instance, the surroundings of the motor may not be sufficiently cooled and this is especially the case during the summer. Because of this, it is not possible to satisfactorily start the motor, making it necessary to repeat the startup procedure several times.

The time constant circuit or the trigger circuit for control of the state of conductivity of the triac is not directly responsive to the action of the motor and controlling the triac as shown in the '853 patent or the '767 patent references, with a consequence that the operation of the triac becomes unstable. To avoid this, it becomes necessary to set the time for the triac to turn off longer which results in a problem of not being able to start the motor quickly when re-starting the motor.

SUMMARY OF THE INVENTION

It is an object of the present invention to overcome the prior art limitations described above and provide an improved power-saving motor starter device.

Another object of the present invention is the provision of a power-saving motor starter device capable of controlling the power supply to the start winding in complete synchronization with the startup of the motor.

In accordance with the invention, a motor starter device for a motor having a main winding and a start winding has a positive coefficient of resistivity (PTC) thermistor connected in series with the start winding. A triac is connected between the PTC thermistor and the power line and a triac control circuit is connected to the gate terminal of the triac, the triac control circuit supplying voltage that is in conformity with the incoming current to the gate terminal at the time of startup of the motor and causing the triac to conduct at the time of motor startup.

Desirably, the triac control circuit has a current detecting circuit that detects the incoming current at the time of startup of the motor and a voltage generating circuit that produces a gate voltage on the basis of the current that has been detected by the current detecting circuit and supplies that voltage to the gate terminal.

Desirably, the current detecting circuit has a current transformer that includes a primary winding and a secondary winding and, by selecting the ratio between the turns of the primary winding and the turns of the secondary winding, produces selected current and the voltage generating circuit includes a resistor that is connected in parallel with the secondary winding and supplies the voltage obtained from the resistor to the gate terminal.

Desirably, the triac control circuit supplies a voltage to the gate terminal whose value is greater than the threshold value of the triac in response to the incoming current at the time of startup of the motor and supplies a voltage whose value is smaller than the threshold value that is conducted by the triac in response to the current during normal operation subsequent to the startup of the motor. The incoming current includes the current during the period ranging from the startup of the motor to the assumption of a state of high resistance by the PTC thermistor.

Moreover, the motor starter device has a control circuit that controls the electric current that flows to the start winding in response to the incoming current at the time of startup of the motor. In a preferred embodiment, the motor circuit has a voltage generating circuit that produces voltage in conformity with the incoming current comprising first and second triacs each having first and second electrodes and a gate terminal. The second electrode of the first triac is connected to the second electrode of the second triac and the first electrode of the first triac is connected to the gate terminal of the second triac, with the voltage from the voltage generating circuit being supplied to the gate terminal of the first triac, the second electrode of the second triac is connected to the start winding and the first electrode of the second triac is connected to the power source line.

Desirably, the voltage generating circuit includes a current transformer that has been connected to the power line, a rectifier that has been connected to the current transformer and a resistor that has been connected to the output of the rectifier, thereby producing the gate voltage from said resistor to the first triac.

Desirably, the motor starter device includes an overload protection device that is connected to the motor in series, with said overload protection device including a bimetal switch that shuts off the current upon the occurrence of an overload current to the motor. In addition, the overload protection device may contain a heater which is placed in series with the bimetal switch.

According to the motor starter device of this invention, there is provided a triac control circuit that controls the operation of the triac in conformity with the incoming current at the time of startup of the motor. Therefore, it becomes possible to directly monitor the electric current of the motor and effect the on-off control of the triac at a timing that has been synchronized with it. Moreover, it is possible to reduce the power consumption by the start winding to practically zero at the time of normal operation after the startup of the motor. A power-saving affect can be obtained by merely adding the triac control circuit, with a consequence that the cost of the motor starter can be reduced.

Additional objects and features of the invention will be set forth in part in the description which follows and in part will be obvious from the description.

The objects and advantages of the invention may be realized and attained by means of the instrumentalities, combinations and methods particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings.

DETAILED DESCRIPTION OF PREFERRED EMBODIMENTS

Figure 1:
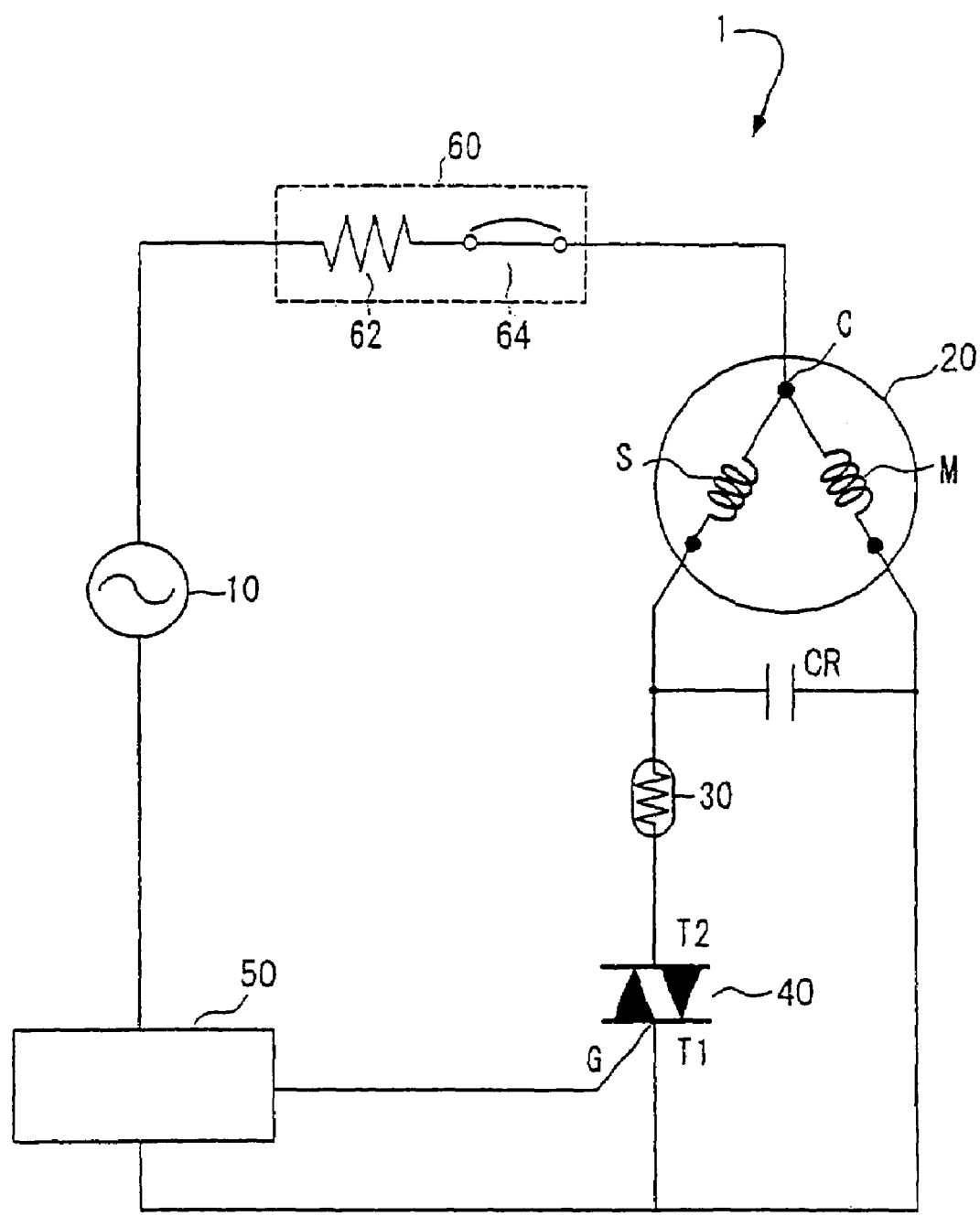
FIG. 1 shows a schematic circuit diagram of a motor starter device according to the first preferred embodiment of this invention.

FIG. 1 shows a motor system 1 comprising the construction of a motor starter device according to the first embodiment used with a single phase induction motor 20 powered by an alternating current power source 10. The motor starter device comprises a positive coefficient of temperature thermistor (which will hereafter be referred to as a PTC thermistor) connected in series with the start winding S of motor 20, a triac 40 connected in series with PTC thermistor 30, a triac control circuit 50 connected in series with alternating current power source 10 and an overload protection device 60 connected between alternating current power source 10 and motor 20.

Motor 20 includes a main winding M and a start winding S, with the common terminal C being connected to overload protection circuit 60. A capacitor CR is connected between start winding S and main winding M for improving the efficiency of the motor. PTC thermistor 30 is provided for the purpose of sending electric current to start winding S at the time of startup of the motor; its properties are selected in conformity with the specification of the motor. For example, a PTC thermistor 30 having a Curie temperature of approximately 120 degrees. When the temperature is below the Curie temperature, the resistance is low at several ohms. When it is exceeded, the resistance value rises sharply, reaching as high as approximately five kilo-ohms.

Triac 40 is a dual directional control rectifying element (dual directional thyristor) and has electrodes T1 and T2 plus gate terminal G. Electrode T2 is connected to PTC thermistor 30 and electrode T1 is connected to the power source line. The gate terminal G is connected to the triac control circuit 50. Triac 40 provides the on-off control between electrodes T1 and T2 in conformity with the gate current and gate voltage that are impressed on gate terminal G.

Triac control circuit 50 impresses such voltage and current on gate terminal G that are in conformity with the incoming current at the time of startup of the motor. In other words, triac control circuit 50 supplies a voltage and current on gate terminal G which are higher than the threshold value (approximately 0.7 volts as the minimum threshold voltage and approximately 20 milli-amperes as the minimum threshold current) conducted by triac 40 when a comparatively large incoming current occurs at the time of the startup of the motor. When the current has become smaller after the incoming current when the PTC thermistor 30 resistance has become high, it supplies a voltage and current on gate terminal G smaller than the threshold value of triac 40.

Overload protection device 60 has a heater 62 and a bimetal switch 64 that are connected in series between common terminal C and alternating current power source 10. Overload protection device 60 opens the circuit by means of bimetal switch 64 at the time of an overload operation or a restrained operation of the motor which results in a greater current than that which occurs during regular operation. As a result, heater 62 is heated and, in response to it, bimetal switch 64 snaps to the open state. At the same time, the winding temperature of the motor and the shell temperature of the motor rise during such an operation and the shell temperature of the motor also rise; with a result that there are cases where the bimetal switch 64 also may snap open in response to the elevated temperature of the motor.

Preferably, a heat-resistant substance such as nichrome wire, for instance, can be used for heater 62. During abnormal operation of the motor, the temperature of the environment surrounding the overload protection device 60 may be in the neighborhood of 130 degrees centigrade due to heating of heater 62 and the elevation of the temperature of motor 20. The bimetal switch 64 snaps open at the temperature of 120 degrees centigrade, to cite an example.

The operation of the motor starter device which is shown in FIG. 1 will be explained below:

When an alternating current voltage of 100 volts, for example, is provided by the alternating current power source at the time of startup of the motor, electric current is impressed on the triac control circuit 50 via overload protection device 60 and main winding M.

Figure 2:
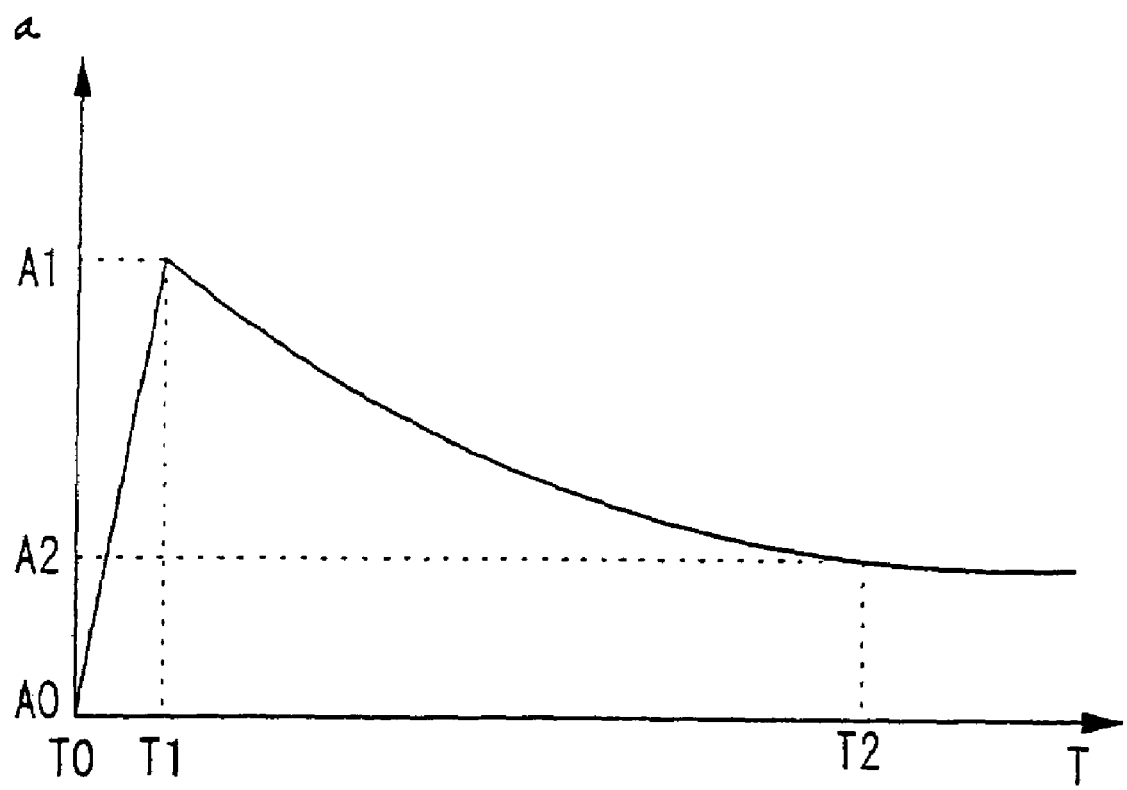
FIG. 2 is a diagram of the waveform of the current that is caused to flow to the motor using the FIG. 1 device.

FIG. 2 shows the current waveform that flows when the motor is started up, with the axis of abscissas indicating the time and the axis of ordinates indicating the electric current. At the time of motor startup (T0), current A0 begins to flow to triac control circuit 50. In response to this current, triac control circuit 50 quickly supplies a voltage and current to gate terminal G of triac 40 greater than the threshold value of triac 40. As a result of this, triac 40 is turned on and the startup current flows through the start winding S and PTC thermistor 30. As a result, the current value that flows to the motor 20 rises sharply and the motor 20 is started.

The value of the current that flows to the motor forms a peak A1 at time T1. At time T2 approximately one second after time T0, or at the time when PTC thermistor 30 has gone beyond the Curie point, thereby assuming a state of high resistance, the current value drops to A2. The current value A2 at this time is smaller than the current value A1. When the current value reaches A2, the triac control circuit 50 supplies to the gate terminal G a voltage and current which are smaller than the threshold value of the triac 40 thereby turning off triac 40. After completion of the startup of the motor or, in other words, at the time when the motor is in regular or normal operation, the current to the motor shows approximately a constant value of A2.

After startup of the motor, or during regular operation in this manner, the power consumption of PTC 30 can be set almost at zero by turning triac 40 off.

In fact, only an extremely small amount of leak current is produced due to the triac 40 itself.

As the motor starter device according to this embodiment can be obtained by merely adding triac 40 and/or triac control circuit 50 to a conventional motor starter device, the existing design specification can be utilized as it is and, thus, a lower cost motor starter device can be provided as a result.

The incoming current as used in this invention can be defined as the current between time T0 shown in FIG. 2 and time T2 when PTC thermistor 30 assumes a state of high resistance. This current, from the startup to the normal operation of the motor, is greater than the current value A2 that flows during normal operation.

Accordingly, it is only necessary for the triac control circuit 50 to set a threshold value between the current values A1 and A2, with a result that triac 40 is turned on when the incoming current appears and, when the current after the incoming current decreases to the normal level, the triac is turned off in perfect synchronization with the current of the actual motor.

Figure 3:
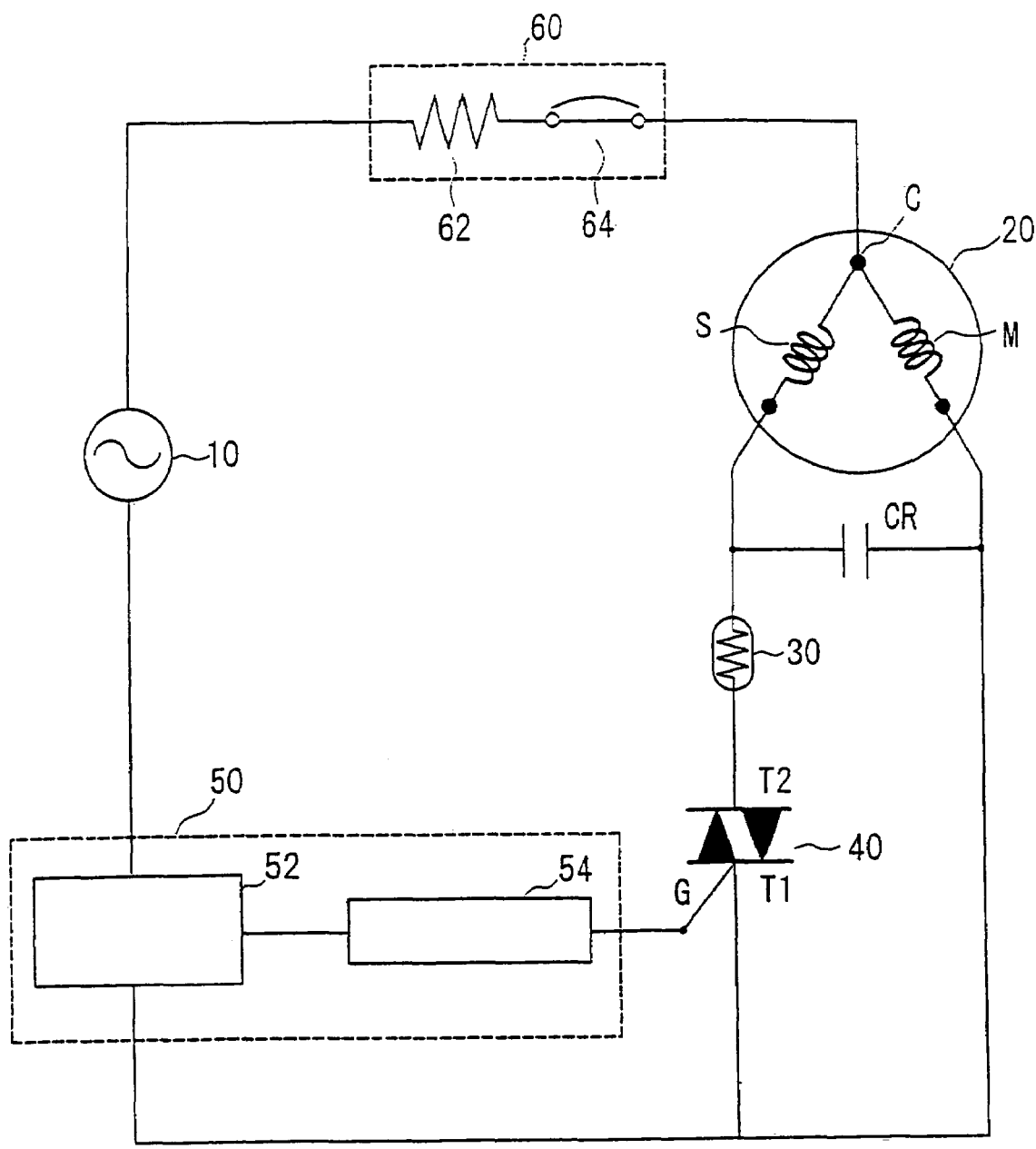
FIG. 3 is similar to FIG. 1 along with a further schematic diagram of a triac control circuit.

FIG. 3 shows a preferred embodiment of the triac control circuit 50. Triac control circuit 50 has a current detection circuit 52 and a voltage generating circuit 54. The current detection circuit 52 detects the incoming current that flows to motor 20 and supplies the result of this detection to the voltage generating circuit 54.

When the incoming current at startup occurs in current detection circuit 52, the voltage generating circuit 54 supplies both voltage and current which are greater than the threshold value of gate terminal G of triac 40, and supplies both voltage and current which are less the threshold value to triac 40 after startup when the electric current in detection circuit 52 is less than the incoming current.

Figure 4:
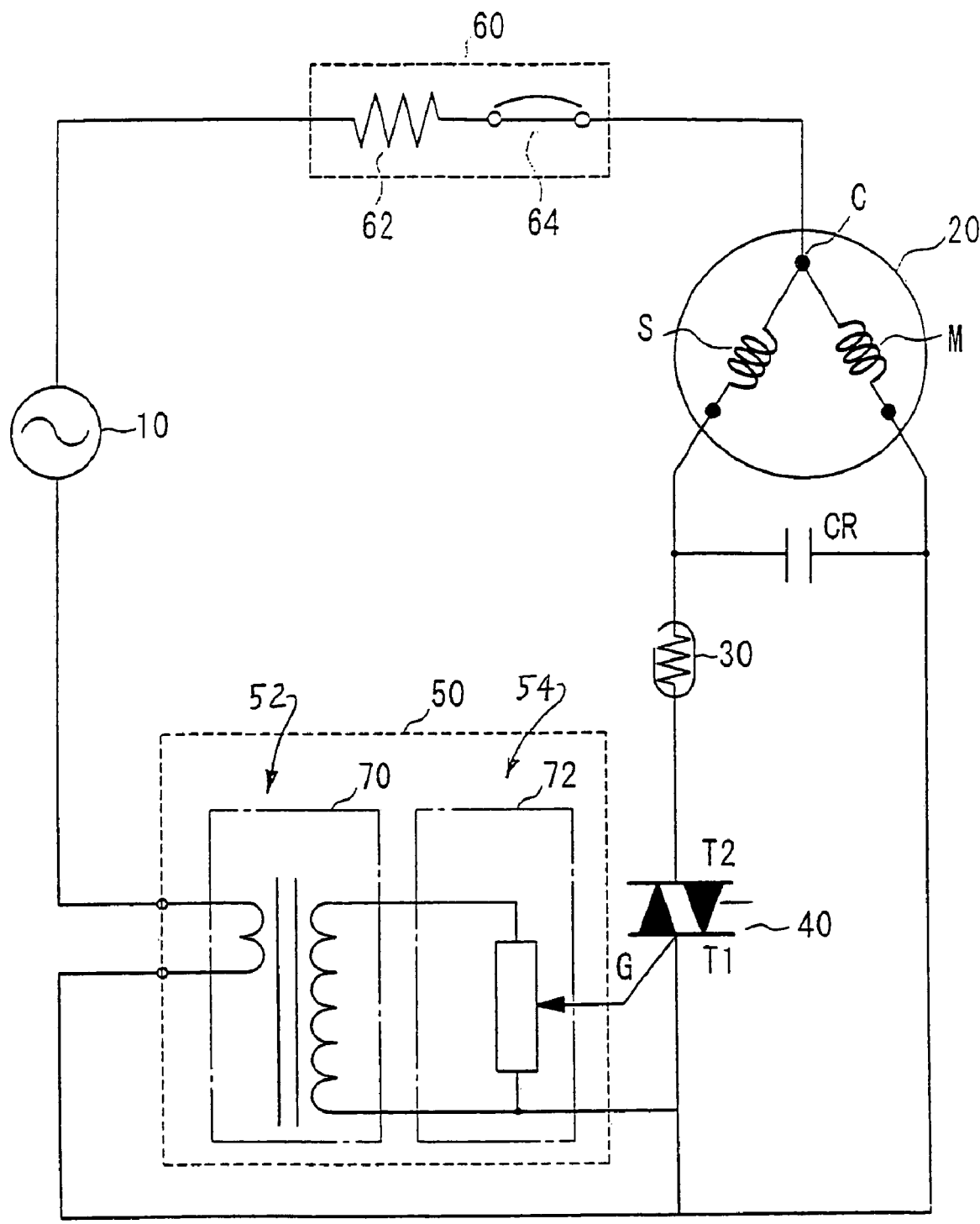
FIG. 4 is similar to FIG. 1 along with a further schematic diagram of the construction of a triac control circuit.

FIG. 4 shows a preferred embodiment of the specific circuit construction of triac control circuit 50. The current detection circuit 52 comprises, for instance, a current transformer 70. The current transformer 70 has a primary winding and a secondary winding, the primary winding being connected in series with the alternating current power source 10. The current transformer outputs a current value which is in conformity with the ratio of the number of turns of the windings.

The voltage generating circuit 54 includes a resistor 72 which has been connected in parallel with the secondary winding. When the incoming current has been inputted to the current transformer 70, resistor 72 converts the current value that has been outputted by the secondary winding into a voltage which is greater than the threshold value of triac 40.

When the current decreases after the incoming current has been inputted to the current transformer 70, conversion is made to a voltage which is smaller than the threshold value of triac 40. Desirably, resistor 72 is made by using a variable resistor and the resistance value may be adjusted to meet the threshold value of triac 40.

For instance, assume that the incoming current is at least six amperes, the threshold value of the triac is 15 milli-amperes, the minimum operating voltage is 1.5 volts, and the turns of the primary winding of the current transformer 70 is two. The current transformer follows the formula: primary current by the number of turns of the primary winding equals the secondary current by the number of turns of the secondary winding. Because of this, the number of turns of the secondary winding is calculated to be 800 and resistor 72 is calculated to be 100 ohms.

Figure 5:
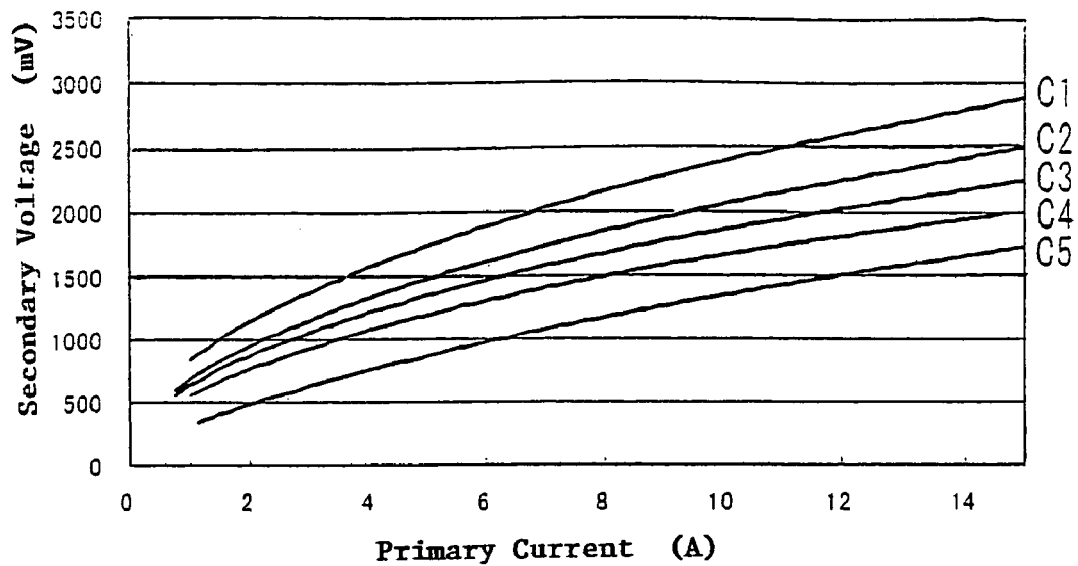
FIG. 5 shows secondary voltage vs. output voltage for winding ratio/resistance examples shown in Table 1.

FIG. 5 shows selected examples of the current transformer 70 and resistor 72. The axis of the ordinates shows the secondary voltage (milli-volts: mV) from resistor 72 and the axis of abscissas shows the current (amperes: A) of the primary winding of current transformer 70.

In addition, Table 1 shown below shows selected examples of the winding ratio of the curves C1 through C5 and the resistance value. When the threshold value voltage of triac 40 is set at 1.5 volts, the size of the incoming current (primary current) when the motor is started is in the range between 4 and 12 amperes, thereby making it possible to control the triac. In other words, it becomes possible to obtain a workable incoming current from the point of crossing between the secondary voltage of 1500 mV (the threshold value voltage of the triac) and the curves C1 through C5.

TABLE 1

| Curve | Primary Winding Turns | Secondary Winding Turns | Ohms |
|---|---|---|---|
| C1 | 2 | 350 | 1000 |
| C2 | 2 | 350 | 220 |
| C3 | 2 | 300 | 220 |
| C4 | 2 | 300 | 100 |
| C5 | 2 | 300 | 47 |

The point of crossing at the incoming current of 12 amperes is on curve C5 and the point of crossing at the incoming current of 3.8 is on curve C1. As there is a large difference between the incoming current (A0 through A2 in FIG. 2) and current A2 during the course of a regular operation, it becomes comparatively easy to set the threshold value of the triac control circuit 50 between these crossing points.

Figure 6:
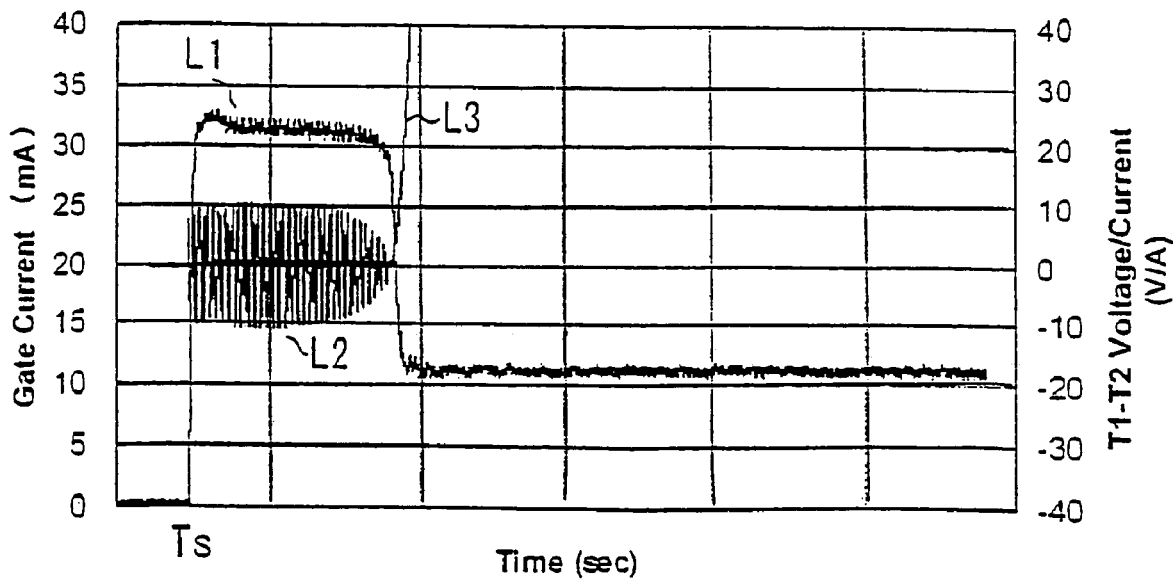
FIG. 6 shows the gate current waveform of the motor starter device according to the first preferred embodiment.

FIG. 6 is a waveform showing the operation of the motor starter device shown in FIG. 4. The left side of the axis of the ordinates indicates the gate current (mA) and the right side thereof shows the voltage (V) between the electrodes of the triac and the axis of abscissas shows the time in seconds. In the same figure, as soon as startup begins for the motor at time Ts, gate current L1 for the triac 40 rapidly increases to approximately 30 mA. Because of this, the triac is turned on and an alternating current like waveform L2 flows to start winding S of motor 20.

When a second passes from the startup of the motor, the PTC thermistor 30 assumes a state of high resistance and the current (whose waveform is L2) that flows through the start winding S is caused to converge. At the same time, the gate current comes down to the neighborhood of about 10 mA. In addition, the gate voltage also comes down, with the triac also being turned off, and the voltage between the electrodes of the triac increases as shown in L3. (Zero voltage between the electrodes of the triac means that the triac is on.)

The on and off states of the triac are controlled in synchronization with the incoming current of the motor in this manner and it becomes possible to turn off the electric current to the PTC thermistor 30 in a desirable state.

Figure 7:
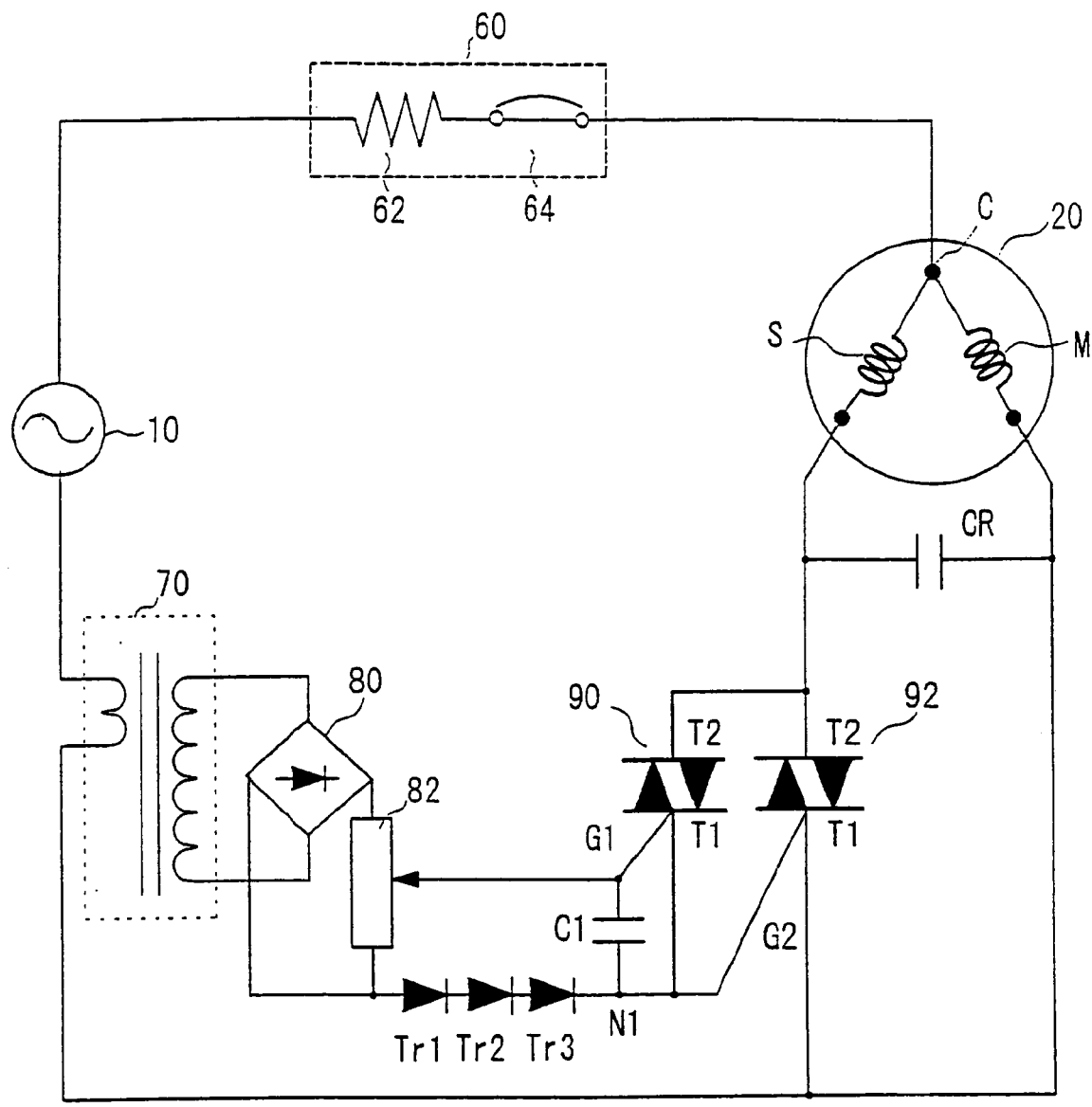
FIG. 7 is a schematic of the circuitry of the motor starter device according to a second preferred embodiment of this invention.
Figure 8:
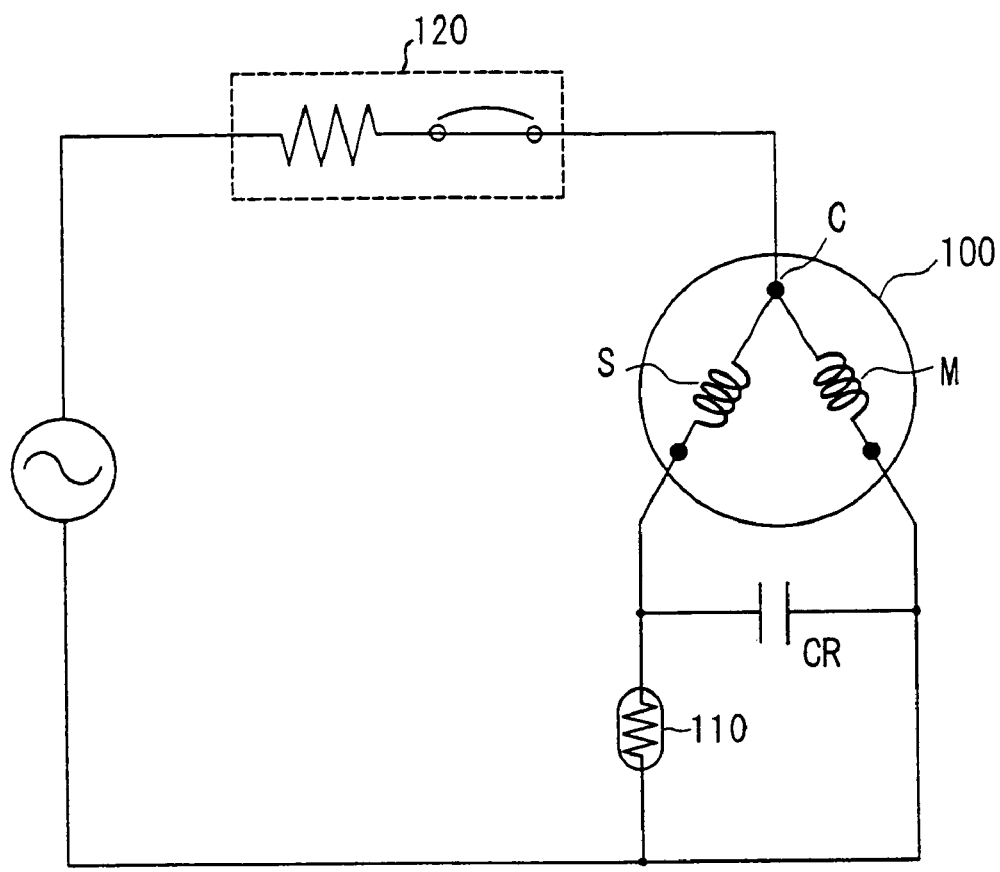
FIG. 8 is a schematic circuit diagram of a Prior Art motor starter device.
Figure 9:
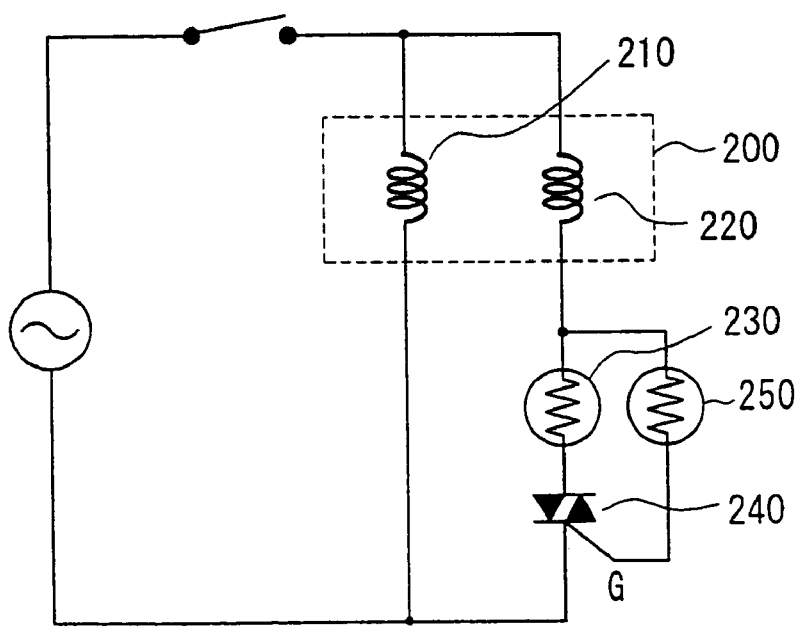
FIG. 9 is a schematic circuit diagram of another Prior Art motor starter device.

Next, the motor starter device according to a second preferred embodiment of this invention is shown in FIG. 7. It is mentioned in this connection that the same components as shown in FIG. 1 bear the same reference numbers. In contrast with the first embodiment, the motor starter device according to the second embodiment does not employ a PTC thermistor for motor startup and the current to the start winding is turned on or off by means of triacs.

As is shown in the same figure, current transformer 70 is connected to the power source line of the alternating current power source 10 and a rectifier 80 comprising a bridge circuit is connected to its secondary side. A variable resistor 82 is connected at one of the output terminals of rectifier 80 and the output of the variable resistor 82 is connected to gate terminal G1 of first triac 90. Three diode connected transistors Tr1, Tr2 and Tr3 are connected in series with the other output end of rectifier 80 and a capacitor C1 is connected between output node N1 and the output of variable resistor 82.

Electrode T2 of first triac 90 is connected to electrode T2 of second triac 92 and, moreover, its electrode T1 is connected to the node N1. Electrode T2 of second triac 92 is connected in series to start winding S and, in addition, its electrode T1 is connected to the power source line. Moreover, gate terminal G2 is connected to electrode T1 of the first triac and node N1.

When the PTC thermistor for motor startup is not used, the difference between the incoming current of the motor and the current during the course of the regular operation becomes smaller. Accordingly, it becomes more difficult to set up variable resistor 82. In the second embodiment, therefore, a small-sized and highly sensitive triac has been used for first triac 90 and a comparatively large-sized one has been employed for second triac 92.

The impedance of the diode-connected transistor is approximately 0.5 volts and a voltage of about 1.5 volts is produced by means of the three transistors Tr1, Tr2 and Tr3 and a value which is extremely close to the minimum threshold voltage 1.5 V of the first triac 90 is set up. As a consequence of this, an extremely small voltage from the variable resistor 82 instantly turns triac 90 on. An amplified voltage is supplied to the gate terminal G2 of triac 92 as triac 90 is turned on, turning on triac 92 with the current flowing to the start winding S.

When a current which is smaller than the incoming current flows, a voltage which is smaller than the threshold value is supplied to gate terminal G1 of first triac 90, with a result that triac 90 turns off. As the triac turns off, the gate voltage of triac 92 becomes lower than the threshold value, with a result that triac 92 turns off and the flow of the current to the start winding S is shut off.

According to the second embodiment, the amount of power consumed by the start winding can be brought extremely close to zero by means of the startup control of the motor by combining the first and second triacs. As the PTC thermistor for startup is not used, moreover, it becomes possible to instantly restart the motor.

The term "motor starter device" according to the above examples is not to be interpreted in a restrictive manner. Rather, it should be interpreted in such a fashion that it includes the function of motor startup for the motor startup system or the motor startup circuit and so forth.

Although the invention has been described with regard to specific preferred embodiments thereof, variations and modifications will become apparent to those skilled in the art. It is therefore, the intention that the appended claims be interpreted as broadly as possible in view of the prior art to include all such variations and modifications.

What is claimed:

1. A motor starter device for use with a motor having a main winding and a start winding, comprising a positive coefficient of temperature (PTC) thermistor connected in series with the start winding, a triac connected between the PTC thermistor and a power source line and a triac control circuit connected in series with the start winding and said main winding and connected to the gate terminal of the triac, the triac control circuit supplying voltage to the gate terminal that is in conformity with the incoming circuit current at the time of the startup of the motor and making the triac conductive at the time of the motor startup, said triac control circuit further comprising a current detecting circuit that detects the incoming circuit current and a voltage generating circuit that produces voltage on the basis of the current that has been detected by the current detecting circuit, said current detecting circuit comprising a current transformer that includes a primary winding connected in series with the power source line and a secondary winding, the current transformer produces the electric current that has been converted from the secondary winding side through the selection of the winding number ratio between the primary winding and the secondary winding and the voltage generating circuit includes a resistor that is connected in parallel with the secondary winding and supplies the voltage that is obtained from the resistor to the gate terminal.

2. A motor starter device according to claim 1 where the resistor is a variable resistor.

3. A motor starter device according to claim 1 in which the triac control circuit supplies a voltage that is greater than the threshold value that the triac conducts in response to the incoming current to the gate terminal at the time of the startup of the motor and supplies voltage which is smaller than the threshold value to the gate terminal in response to the current during the regular operation subsequent to the startup.

4. A motor starter device according to claim 3 in which the incoming current includes the current during the period ranging from the startup up of the motor to the PTC thermistor assuming a state of high resistance.

5. A motor starter device for use with a motor having a main winding and a start winding, comprising a control circuit that controls the current that flows to the start winding in response to the incoming current at the time of the motor startup, the control circuit including a voltage generating circuit that produces voltage that is in conformity with the incoming current, a first triac having a first and a second electrode and a gate terminal and a second triac having a first and a second electrode and a gate terminal, the second electrode of the first triac is connected to the second electrode of the second triac, the first electrode of the first triac is connected to the gate terminal of the second triac, with the voltage from the voltage generating circuit being supplied to the gate terminal of the first triac, the second electrode of the second triac is connected to the start winding and the first electrode of the second triac is connected to the power source line.

6. A motor starter device according to claim 5 where the voltage generating circuit includes a current transformer that is connected to the power source line, a rectifier that is connected to the current transformer and a resistor that is connected to the output of the rectifier, thereby producing gate voltage that is supplied from the resistor to the gate terminal of the first triac.

7. A motor starter device as described in claim 1 wherein the motor starter device includes an overload protection device that is connected in series with the motor and the overload protection device includes a bimetal switch that shuts off the current when the excessive current has flowed to the motor.

8. A motor starter device according to claim 7 where the overload protection device includes a heater that is connected in series with the bimetal switch.

* * * * *